June 4, 1929.  J. F. HORNE  1,715,601
MILK STRAINER
Filed Nov. 30, 1925
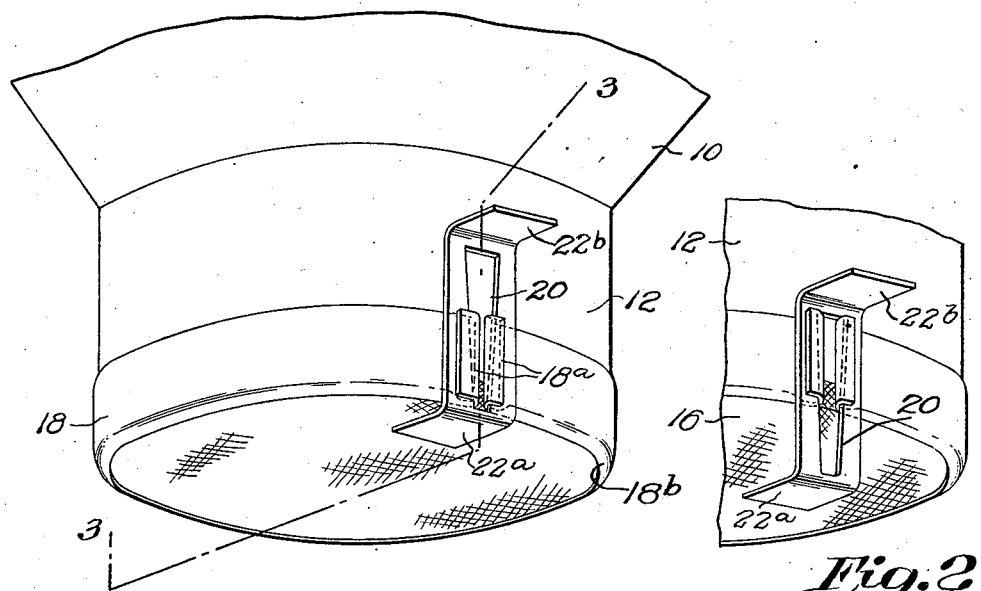
Fig.1  Fig.5  Fig.2
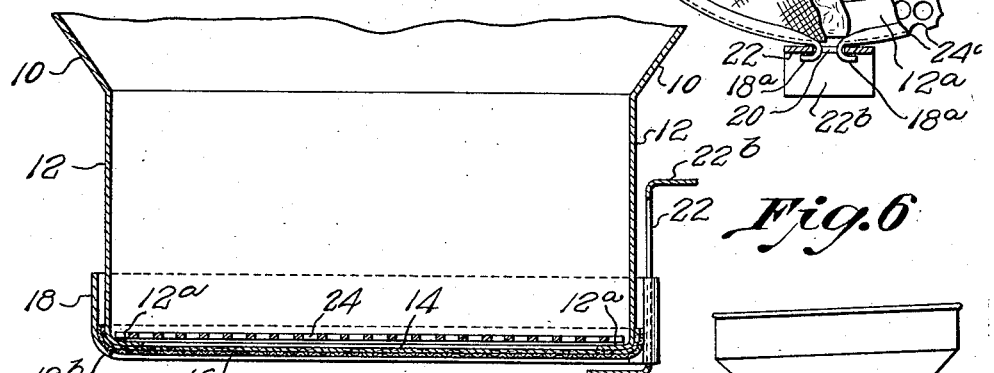
Fig.6
Fig.3
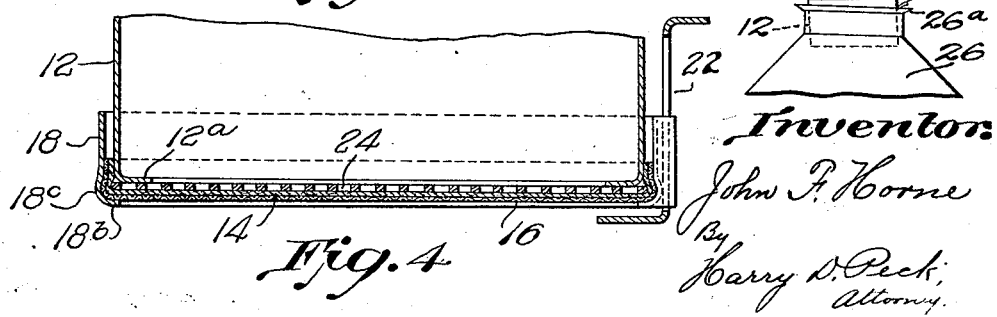
Fig.4
Inventor:
John F. Horne
By Harry D. Peck
Attorney.

Patented June 4, 1929.

1,715,601

UNITED STATES PATENT OFFICE.

JOHN F. HORNE, OF PORTLAND, MAINE; FLORENCE P. DAVIS, EXECUTRIX OF SAID JOHN F. HORNE, DECEASED, ASSIGNOR TO WEALTHY H. HORNE.

MILK STRAINER.

Application filed November 30, 1925. Serial No. 72,277.

This invention relates to strainers. More especially it relates to a strainer having a discharge nozzle over whose opening the straining material is held. It is illustrated and described herein in its particular application to a strainer for milk, but it is adapted for straining other liquids as well.

In straining milk it is the practice today, and indeed in some jurisdictions it is required by law, to use the straining material but once. This obviously makes it necessary, from the standpoint of economy, to utilize as much of the material as possible for straining and to use as little of the material as need be for holding it in place, and to use the most effective material that can be obtained or devised. So far as I am aware the best materials heretofore available for milk strainers are fine wire mesh and closely woven fabric, such as flannel or cheese-cloth. The inadequacy of these materials has been recognized however and attempts have been made to supplement their short-comings by placing more or less cotton on the approach side of the screen or fabric. This has proven of little value because when a pailful of milk is poured into the hopper, the force with which it strikes the cotton causes the latter to tear and roll, so it soon bunches up, becoming thicker in some places where the milk cannot pass and becoming thinner in others, where the milk necessarily flows through without being strained to the degree desired.

The present invention is directed to the provision of straining material having a cotton layer and means for holding this layer uniformly in place until the straining is complete. Among its objects is the provision of means to protect this cotton layer from the initial surge of the milk and from the weight of the milk during the straining, to the end that the cotton will remain evenly distributed across the nozzle opening and enable the milk to pass through the maximum extent of straining area. It is a further object to hold this straining material at its very periphery by clamping it to the edge of the nozzle, and to provide additional means for holding it against slippage. It is a feature that such additional means tend to mutilate the material and thereby prevent its re-use but this is not necessary because the material does not lend itself to re-use and its size is such, in comparison to the opening of the nozzle, that the natural shrinkage will make it too small to be replaced across the nozzle opening after it has been once used and removed. It is a further feature of this invention that the clamping means which hold the straining material on the nozzle are aided, and in fact urged, by the weight of the hopper and its contents to more tightly grip the material. And the milk itself in passing through the material tends to make the latter engage the holding means more securely. Although it is believed that a single composite layer of the straining material is sufficient, it is a feature that multi-layers may be supported by the same means that hold the single composite layer.

These objects and the features which characterize the construction herein disclosed, are attained by providing straining material having a thin sheet of absorbent cotton veneered with a piece of relatively open mesh cotton gauze. The composite layer is cut slightly greater in area than the opening of the nozzle of a hopper, so that when placed across the said opening the edge of the material will overlie somewhat the edge of the nozzle. Around the latter, which is preferably inverted at the time, a split band is slipped whose ends are bent out from the side of the nozzle in the form of shallow hooks. One edge of the band is turned inward forming a sort of flange which brings up against the nozzle edge and thereby determines the proper positioning of the band, and also presses firmly against the edge of the nozzle. A clamp is provided for the band ends which consists preferably of a thin narrow plate of metal, whose ends are bent over on opposite sides of the plane of the plate in the form of arms. In the plane of the plate, extending from near one arm to near the other is a tapered opening through whose large portion the hooked ends of the band can be passed and hooked onto the converging edges of this opening. The clamp can then be slipped across the band, by pressure on one of its bent-over arms, to cause the converging edges of the opening to draw the band ends together and thereby bind the straining material firmly against the nozzle. To remove the band the other arm is pressed in the opposite direction thereby sliding the plate across the band so that the hook ends come again at the widest portion of the opening, whereupon the band can be slipped off the nozzle and the straining material removed. Incidentally, the plate can be removed from the band ends and the parts separately cleaned. When the band is in position on the nozzle, one arm of the clamp lies under the nozzle opening, the plane of the plate is flat against the side of the nozzle, and the other arm projects outward from the said side serving as a hook or catch to engage the edge of the receptacle when the strainer is placed therein. Each time the strainer is changed from one milk can to another, the dropping of the outstanding arm upon the rim of the can, tends to drive the clamp plate further across the band and make the latter more tight. Moreover, when lifting the strainer from a can, there are no projections to catch on the can rim, and consequently there is no danger of pulling the band and straining material off the nozzle. The assembly of the band and clamp on the nozzle makes very little increase in the diameter of the latter because the clamp plate and the shallow hooked ends of the band lie close to the nozzle. This makes it possible to use a strainer with neck substantially as large as the opening of the container into which the milk is strained. This feature, coupled with the arrangement of the straining material on the nozzle so that the milk can pass through the material almost to its very edge, provides the maximum straining surface possible.

The absorbent cotton layer of the straining material is placed on the milk approaching side, being held there primarily by the supporting layer of cotton gauze. Further protection for the thin layer of cotton is attained, however, by having a disk of perforated metal between it and the body of milk. This disk may be made by perforating the bottom of the nozzle, in which case the straining material will be placed outside across this perforated bottom and clamped securely thereto around the edge. Or the bottom may be an open one with merely an inturned peripheral flange, upon which a separate perforated disk may be supported within the nozzle, so that when the milk is poured in it first strikes the metal disk and to a degree is supported by the disk thereafter, although permitted to run through the perforations onto the straining material below. It is preferred, however, when a separate disk is used, to place the latter outside of the hopper and against the exterior of the nozzle flange and then lay the straining material across the disk with its edge overlying both the edge of the disk, and the end of the nozzle as hereinbefore explained. The edge of the metal disk may be smooth, but a serrated edge is preferred and may be easily obtained by simply cutting the disk from a sheet of perforated plate or relatively coarse wire gauze. The outline of this disk in passing through the perforations of the plate or space in the gauze leaves a series of sharp points or serrations which are useful in catching into the straining material as the latter is pressed toward the edge of the disk by the clamping band. The weight of the milk as it flows through the material tends to cause the latter to sag downward in direction to pull the material further onto the serrations, thus increasing the holding effect. If desired, the clamping band may have a circumferential outstanding groove just below its turned over edge, and by making the disk slightly larger, it can extend into this groove and thus enhance the grip on the material as the latter follows the curvature of the groove around the edge of the disk.

It is intended that the patent shall cover by suitable expression in the appended claims, whatever features of patentable novelty exist in the invention disclosed.

In the accompanying drawings:

Figure 1 is a perspective of the nozzle of a strainer embodying the present invention, showing the clamping plate in its holding position;

Figure 2 is a similar perspective, of a portion of the nozzle, showing the clamping plate withdrawn in position to permit removal of the band;

Figure 3 is a medial section of the nozzle, as on line 3—3 of Figure 1, with the metal disk inside the nozzle;

Figure 4 is a section, like Figure 3, but with the metal disk outside the nozzle in the preferred arrangement;

Figure 5 is a plan of a portion of the nozzle, in section through the clamping plate, with parts broken away to show the serrations of the disk; and Figure 6 shows a strainer in position in a can.

Referring to the drawing, the hopper 10 has a nozzle 12 adapted to be inserted in a receptacle receiving the strained milk. The milk is poured into the hopper, in pailfuls, and flows through a composite veneer of straining material, comprising a thin layer of absorbent cotton 14 and a layer of relatively open mesh cotton gauze 16, the thickness of both being somewhat exaggerated in the drawings for clearness. These layers are prepared and cut to a size slightly larger than the area of the nozzle opening, so that when placed thereacross, with the gauze outside, they overhang the edge of the nozzle a short distance.

A split band 18 is then pressed downward around the nozzle (the latter being usually inverted when the former is applied) over the edge of the straining material. The ends 18$^a$ of this band are bent outward in the form of hooks and engage the converging edges of a tapered opening 20 in a clamp 22. The latter is a flat piece or plate of metal having its ends bent over, at about right angles, on opposite sides of the plate, to form arms 22ª and 22ᵇ. When the band is first applied, its hooked ends are at the widest part of the opening 20, as shown in Figure 2, but when the band is properly positioned, as when its inturned edge 18ᵇ reaches the overhanging straining material at the edge of the nozzle, the clamp is slipped across the band by pressure on the arm 22ª. The converging walls of the opening draw the band ends toward each other, thereby forcing the band to exert considerable constrictive force on the periphery of the straining material and clamp it tightly against the edge and side of the nozzle. This force is enhanced when the hopper is placed in the receptacle 26, with the arm 22ᵇ resting on the rim 26ª of the receptacle, because the weight of the hopper and milk, tends to force the band downward in direction to slide its hooked ends further along the narrowing part of the opening 20. To remove the band, the plate 22 is pushed in the reverse direction by the arm 22ᵇ, until the ends 18ª are again in the wider part of the opening. The band can then be slipped off the nozzle, and, if desired, can be unhooked from the plate 22 for purposes of cleaning.

If the milk were to be poured directly onto the layer of absorbent cotton 14, the latter would be torn and mutilated and rendered useless as a straining medium. A disk 24 is therefore provided which can either be made by perforating the bottom of the nozzle, or made separately, so as to rest on the inturned flange 12ª of the nozzle, as in Figure 3, or can be clamped against the exterior side of this flange as in Figure 4. The latter is the preferred arrangement because it there provides a further holding for the straining material. This is best attained by making the edge of the disk serrated, or with sharp points 24ª as seen in Figure 5. This is most easily done by cutting the disk from a perforated plate, in which event the circumference of the disk will pass through various perforations to form a rough edge. Or the disk may be cut from heavy wire mesh, the cut ends of the wire in that case constituting the teeth. When placed outside the nozzle flange 12ª the serrations of the disk pierce the straining material as the latter is pressed inward by the band, thus affording an additional grip on the cotton layers. And further, if desired, a circumferential groove 18ᶜ may be rolled in the band close by its inturned edge, and the disk made large enough to reach barely within the groove. When the straining material is laid around the edge of the disk, its turn within the groove somewhat increases the clamping surface of the band, and the band can more firmly press it onto the serrations.

As the milk is poured into the hopper, most of its force is absorbed by the strong metal disk, thus protecting the weaker veneer of straining material. The weight of the milk is also partly supported by the disk during straining, but sufficient weight is brought to bear upon the cloth layers to cause them to sag slightly and thus afford a straining area that extends to the very edge of the nozzle. Thus the greatest possible straining area is provided and as this includes most of the extent of the straining material, only a small portion of the latter at its periphery is utilized for holding. This prevents the material from being used again, because the natural shrinkage of the layers, after removal and drying, so reduces the size of the material that it cannot again be stretched across the opening. Moreover, the serrations of the metal disk, if the latter is used as in Figure 4, cut the cloth layers so that they are not fit for re-use. And, indeed, the absorbent cotton and gauze themselves are so delicate and fine that they are practically unserviceable after being once used. If desired more than one composite layer may be placed over the nozzle opening and clamped thereto, but this is not considered necessary, unless an exceedingly high degree of straining is required, because a single composite layer is ample.

One of the important features of the strainer of this invention is that the band and clamp do not add appreciably to the size of the nozzle. Consequently a strainer can be made with nozzle large enough to practically fill the neck of a twenty-quart milk can, and this same strainer is then big enough to be used in the neck of a forty-quart can. Another important feature resides in the simplicity of the device, and the ease with which it can be handled. Quite often the dairyman must work in very poor light. This is of no consequence when using the strainer herein disclosed, because the band and its clamp can be applied while assembled. The engagement of the turned-in edge 18ᵇ of the band, with the edge of the nozzle, properly limits the degree to which the band can be pushed onto the nozzle, and the tightening can then be accomplished by simple direct pressure on the clamp arm. The strainer can be used on one can after another with no danger of clogging or leakage, or of the band and straining material being inadvertently removed.

I claim as my invention:

1. A strainer having, in combination, a nozzle with inturned flange surrounding its opening, a perforated disk having serrated periphery, extending across said opening and resting exteriorly on said flange, a sheet of straining material extending across said opening on the discharge side of said disk and overlying its periphery, and means adapted to clamp said material against the serrations of said disk, and to hold both the disk and material on the nozzle.

2. A strainer having, in combination, a nozzle; straining material extending across the opening of said nozzle; and means for clamping said material to said nozzle comprising a split band fitting around the nozzle and having shallow hooked ends and a clamp positioned between said hooked ends and the band and having a tapering slot through which the hooked ends extend and against whose edges the said hooked ends engage; the said clamp being movable with respect to said band to draw its ends closer together and thereby press the said material against said nozzle.

3. A strainer having, in combination, a nozzle; straining material extending across the opening of said nozzle; and means for clamping said material to said nozzle comprising a split band fitting around the nozzle and having hooked ends turned sidewise from said nozzle, and a constricting plate extending across said band underneath said hooked ends having an opening through which said hooked ends project; said opening having opposed edges converging and bearing against said hooked ends whereby the said ends are drawn toward each other upon movement of the plate across the band.

4. A strainer having, in combination, a nozzle adapted to be inserted within a receptacle; straining material extending across the opening of said nozzle; and means for clamping said material to said nozzle comprising a split band fitting around the nozzle and having its ends turned endwise therefrom, and a plate engaging said ends and adapted to draw the ends together to be moved along the side of said nozzle away from its opening; said plate having an outstanding arm adapted to rest on said receptacle when the nozzle is inserted therein whereby the plate is urged in a direction to draw the band-ends together.

5. A strainer having, in combination, a nozzle; straining material extending across the opening of said nozzle; and means for clamping said material to said nozzle comprising a split band fitting around the nozzle and having hooked ends turned sidewise from said nozzle, and a constricting plate extending across said band having a tapered opening through whose larger portion the band ends may be inserted and hooked onto the converging edges of the opening; said plate having an arm at its end for sliding it across said bands whereby the said converging edges draw the band-ends closer together.

6. A strainer having, in combination, a nozzle; straining material extending across the opening of said nozzle; and means for clamping said material to said nozzle comprising a split band fitting around the nozzle and having hooked ends turned sidewise from said nozzle, and a constricting plate extending across said band having a tapered opening through whose larger portion the band ends may be inserted and hooked onto the converging edges of the opening; said plate having offset arms at its ends whereby the plate may be slipped across the band in one direction to draw its ends together and in the opposite direction to permit said ends to spread and loosen the band; said plate being removable from said band for cleaning.

7. A strainer having, in combination, a nozzle; straining material extending exteriorly across the opening of said nozzle and overlying its edge; and means for clamping said material to said nozzle at said edge comprising a split band fitting around said nozzle and having its ends turned outward to form shallow hooks; a plate positioned between the hooks and the band having diverging edges engaging the hooks; said plate being adapted to be moved across the band to effect a tightening of said band against the nozzle.

8. A strainer having, in combination, a nozzle; straining material extending exteriorly across the opening of said nozzle and overlying its edge; and means for clamping said material to said nozzle at said edge comprising a split band fitting around said nozzle and having its ends turned outward to form shallow hooks; a flat plate having a slot therein and having the edges of said slot at an angle with the longitudinal axis of the plate; said plate being arranged between the band and the shallow hooks with the latter engaging the edges of the plate whereby upon the plate being moved across the band the band is tightened against the nozzle.

JOHN F. HORNE.